United States Patent
Chae et al.

(10) Patent No.: US 7,970,073 B2
(45) Date of Patent: Jun. 28, 2011

(54) APPARATUS AND METHOD FOR TRANSMITTING/RECEIVING DATA IN MULTI-USER MULTI-ANTENNA COMMUNICATION SYSTEM

(75) Inventors: Chan-Byoung Chae, Seoul (KR); David Mazzarese, Suwon-si (KR); Sung-Ryul Yun, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1287 days.

(21) Appl. No.: 11/582,172

(22) Filed: Oct. 17, 2006

(65) Prior Publication Data

US 2007/0086540 A1 Apr. 19, 2007

(30) Foreign Application Priority Data

Oct. 17, 2005 (KR) .................. 10-2005-0097720

(51) Int. Cl.
*H04B 7/02* (2006.01)
(52) U.S. Cl. ..... 375/267; 375/347; 375/299; 455/562.1; 455/69; 342/383; 342/377
(58) Field of Classification Search .......... 375/267, 375/299, 347; 455/562.1, 69; 342/383, 377, 342/388
See application file for complete search history.

(56) References Cited

U.S. PATENT DOCUMENTS

| | | | |
|---|---|---|---|
| 6,192,256 B1 | 2/2001 | Whinnett | |
| 2004/0178954 A1* | 9/2004 | Vook et al. | 342/383 |
| 2005/0149596 A1* | 7/2005 | Jeon et al. | 708/607 |
| 2006/0146953 A1* | 7/2006 | Raghothaman et al. | 375/267 |

FOREIGN PATENT DOCUMENTS

KR 1020040012582 2/2004

OTHER PUBLICATIONS

Max H.M. Costa; "Writing on Dirty Paper"; IEEE Transactions on Information Theory; vol. 29; No. 3; May 1983; pp. 439-441.
Choi, Lai-U et al.; "A Transmit Preprocessing Technique for Multiuser MIMO Systems Using a Decomposition Approach"; IEEE Transactions on Wireless Communications; vol. 3; No. 1; Jan. 2004; pp. 20-24.
Behrouz Farhang-Boroujeny et al.; "Layering Techniques for Space-Time Communication in Multi-User Networks"; IEEE Vehicular Technology Conference (VTC'03 Fall); Orlando Fla.; Oct. 2003; pp. 1339-1343.

* cited by examiner

*Primary Examiner* — Eva Y Puente
(74) *Attorney, Agent, or Firm* — The Farrell Law Firm, P.C.

(57) ABSTRACT

Provided is an apparatus and method for transmitting/receiving data in a multi-user multi-antenna communication system. A data transmitting apparatus and method computes a RX filter or a TX filter for each user receiver in an improved scheme, selects a codebook correlating with the computed TX filter or the computed RX filter, and transmits an index of the selected TX filter codebook or an index of the selected RX filter codebook to a receiver. A data receiving apparatus and method receives the codebook index and detects a corresponding RX filter from the codebook by using the received codebook index.

35 Claims, 6 Drawing Sheets

APPARATUS AND METHOD FOR TRANSMITTING/RECEIVING DATA IN MULTI-USER MULTI-ANTENNA COMMUNICATION SYSTEM

PRIORITY

This application claims priority under 35 U.S.C. §119 to an application filed in the Korean Intellectual Property Office on Oct. 17, 2005 and allocated Serial No. 2005-97720, the contents of which are incorporated herein by reference.

BACKGROUND OF THE INVENTION

1. Field of the Invention

The present invention relates generally to an apparatus and method for transmitting/receiving data in a multi-user multi-antenna communication system, and in particular, to a data transmitting apparatus and method for computing a receive (RX) filter and a transmit (TX) filter for each user receiver in an improved scheme, selecting a codebook correlating with the computed TX filter or the computed RX filter, and transmitting an index of the selected TX filter codebook or an index of the selected RX filter codebook to a receiver; and a data receiving apparatus and method for receiving the codebook index and detecting a corresponding RX filter from the codebook using the received codebook index.

2. Description of the Related Art

Research has been conducted on Multiple Input Multiple Output (MIMO) channels over the past ten years. In addition, research is being conducted on multi-user multi-antenna communication system. The use of multi-antenna in a transmitter increases spectral efficiency and also the use of multi-antenna in a receiver further increases spectral efficiency. The research on the multi-user multi-antenna communication system is intended to apply the above advantage to a multi-user communication system.

A MIMO communication system establishes a multi-link between a transmitter and a single user, thereby increasing spectral efficiency. In the MIMO communication system, only one user can access a given resource among channel resources (e.g., subcarriers, spreading codes, and cell sectors) at a time. That is, a MIMO link (i.e., independent data streams) exists between a transmitter and only one receiver at a given time. On the other hand, the multi-user multi-antenna communication system allows a plurality of users (terminals) to access the same resource simultaneously, and independent data streams occur between a transmitter and a plurality of user receivers. A multiplexing scheme used for this is called "multi-user Spatial Multiplexing (SM)".

Figure 1:
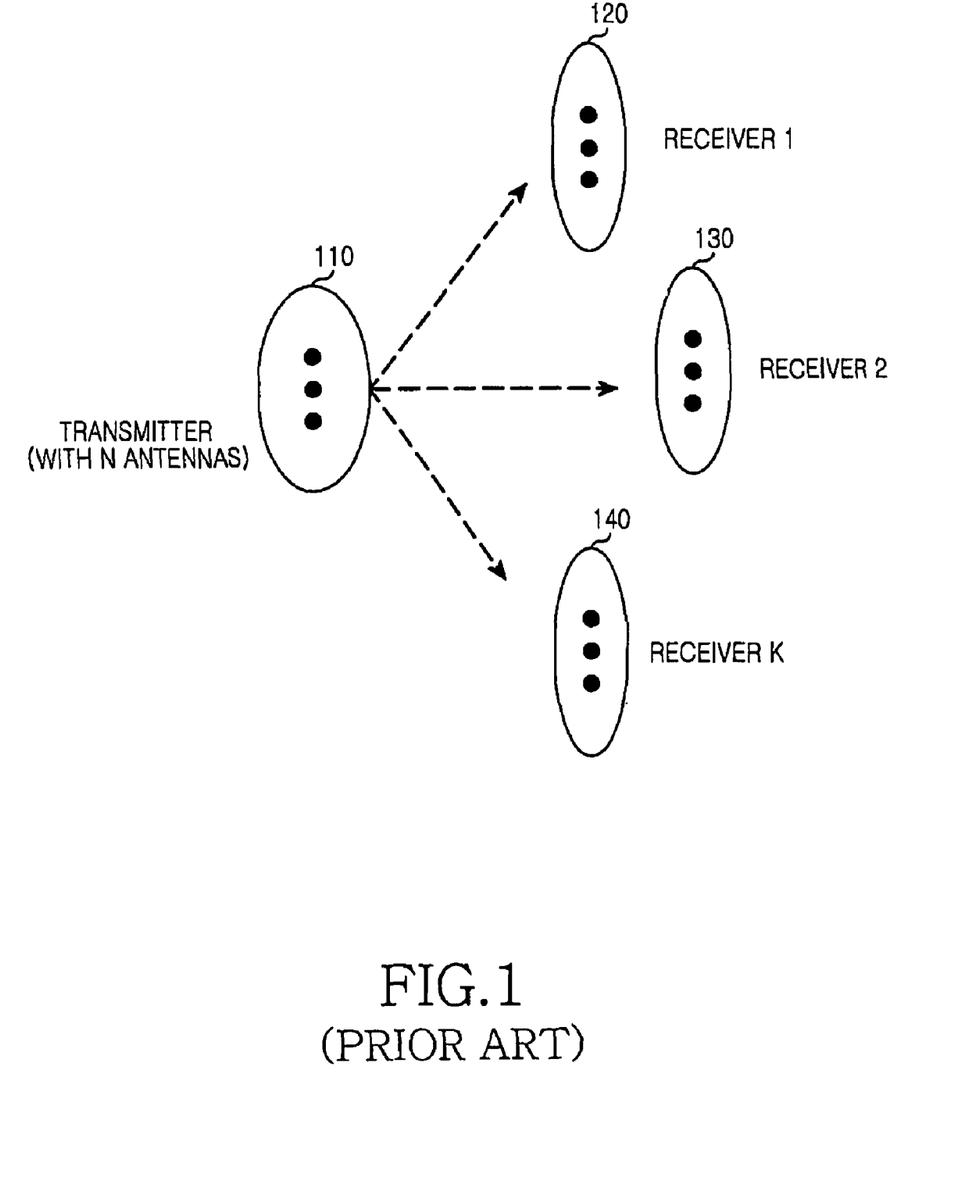
FIG. 1 is a schematic block diagram of a multi-user multi-antenna communication system where communications are performed between a transmitter having a plurality of TX antennas and a plurality of receivers each having a plurality of RX antennas.

FIG. 1 is a schematic block diagram of a multi-user multi-antenna communication system where communications are performed between a transmitter having a plurality of TX antennas and a plurality of receivers each having a plurality of RX antennas.

Referring to FIG. 1, a base station (BS) transmitter 110 having an N number of TX antennas (simply referred to as "N TX antennas") communicates with K user receivers 120, 130 and 140 each having a plurality of RX antennas. The transmitter 110 transmits independent data streams to the receivers 120, 130 and 140 using a multi-user SM scheme.

A MIMO broadcast channel, an example of a multi-user multi-antenna communication channel, is a downlink (DL) channel of a cellular network where a base station (transmitter) uses a multiple TX antenna.

An example of a theoretical scheme for an MIMO broadcast channel in a cellular system is disclosed in M. Costa, "Writing on Dirty Paper", IEEE Transactions on Information Theory, Vol. 29, No. 3; pp. 439-441, May 1983. This theoretical scheme is, however, unrealistic because it is based on the assumption that a transmitter and every user receiver accurately know channels of all user receivers. In addition, the above theoretical scheme is too complex because it uses non-linear precoding techniques.

Figure 2:
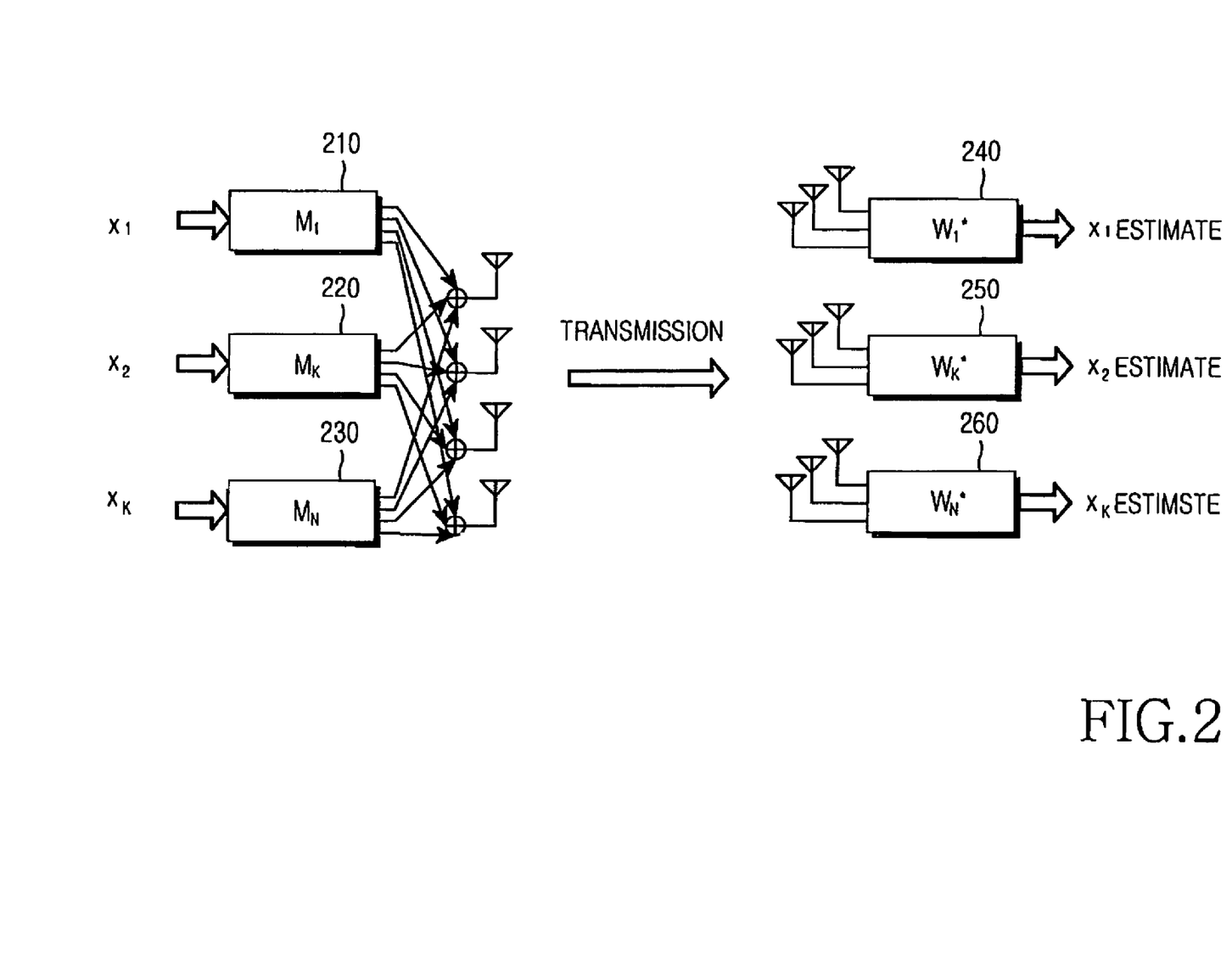
FIG. 2 is a block diagram of a multi-user multi-antenna communication system to which the present invention may be applied, where a transmitter uses a plurality of TX antennas and a TX filter and a plurality of receivers each use a plurality of RX antennas and an RX filter.

FIG. 2 is a block diagram of a multi-user multi-antenna communication system where a transmitter uses a plurality of TX antennas and a TX filter and a plurality of receivers each use a plurality of RX antennas and an RX filter. For actual communication, a transmitter uses a TX filter and each receiver uses an RX filter.

Referring to FIG. 2, the transmitter includes SM TX filters 210, 220 and 230 that include TX filters $M_l$, $M_k$, ..., $M_n$, respectively. Likewise, the receivers respectively include SM RX filters 240, 250 and 260 that include RX filters $W_l$, $W_k$, ..., $W_n$, respectively.

A multi-user SM scheme, disclosed in Lai-U Choi and Ross D. Murch, "A Transmit Preprocessing Technique for Multiuser MIMO Systems Using a Decomposition Approach", IEEE Transactions on Wireless Communications, Vol. 2, No. 4, pp. 773-786, July 2003, is based on the assumption that some entity (terminal) knows channel matrixes of all users (terminals) and can compute TX/RX filters for optimization of communication performance.

The disclosed multi-user SM scheme is, however, silent on which entity can compute the TX/RX filters, and on how the computed TX/RX filter information (knowledge) can be transmitted from a transmitter to receivers. If information (knowledge) about all the respective channel matrixes between the transmitter and the receivers is available to the receiver, it is called "global channel information (knowledge)". This is, however, also impossible in an actual system.

Figure 3:
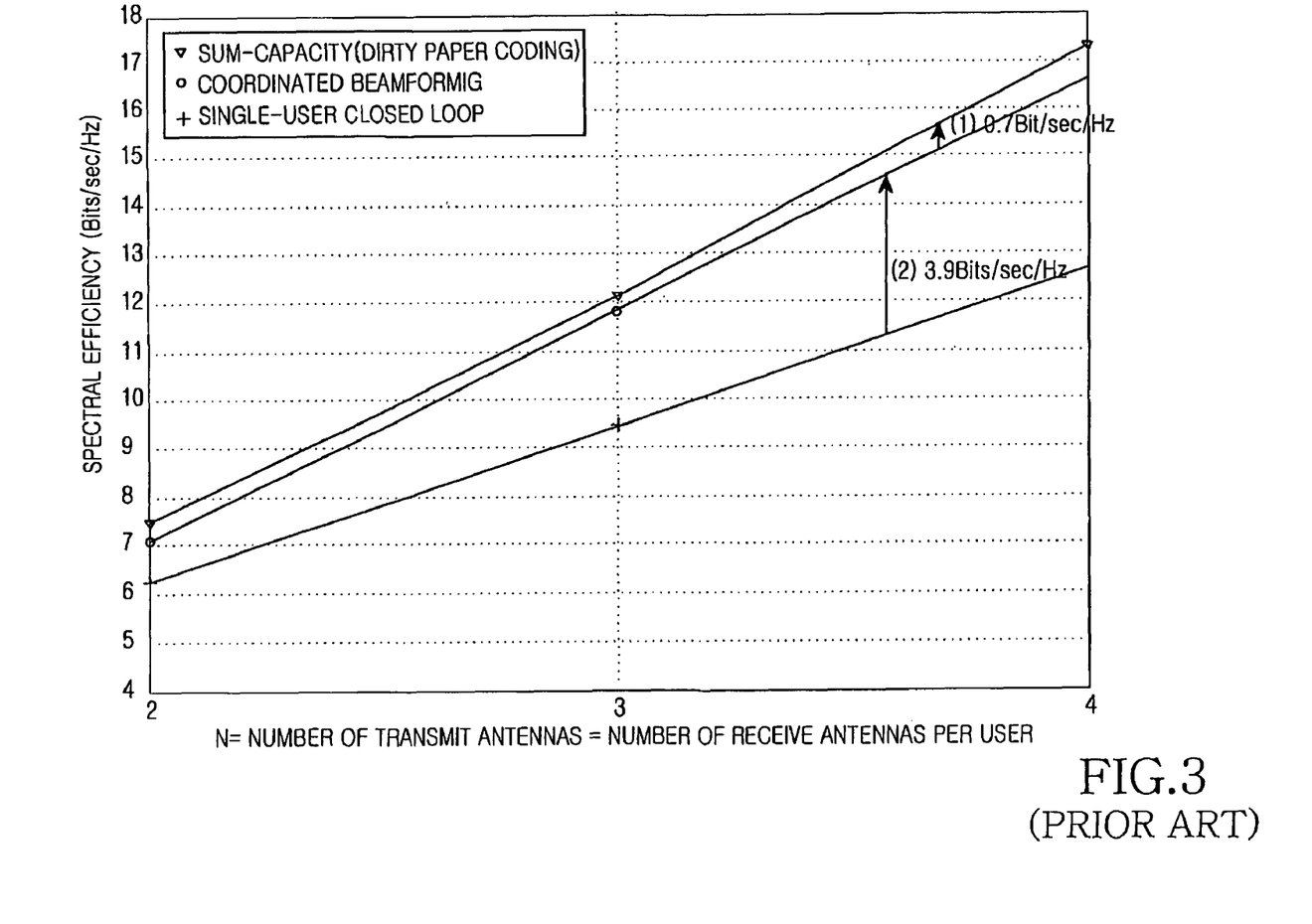
FIG. 3 is a graph illustrating spectral efficiencies depending on the type of algorithm used in a multi-user multi-antenna communication system.

FIG. 3 is a graph illustrating spectral efficiencies depending on the type of algorithm used in a multi-user multi-antenna communication system. In FIG. 3, local Channel State Information (CSI) refers to a realistic case where each receiver knows only its own channel matrix. Global CSI refers to an unrealistic case where each receiver knows channel matrixes of all receivers. Partial CSI refers to a case where a transmitter uses some measure of channel quality which indicates CSI such as signal-to-noise ratio (SNR). Complete CSI refers to a case where a transmitter uses the complex entry of CSI in itself.

As can be seen from FIG. 3, the spectral efficiency in the case of transmission to a single user (single-user closed loop: local CSI, complete CSI) is lower by 4.6 bits/sec/Hz than that in the case of sum-capacity (nonlinear precoding scheme; global CSI, complete CSI), which is the theoretical maximum data rate of a multi-user communication having four TX antennas, four users, and four RX antennas. Although not illustrated in FIG. 3, the spectral efficiency decreases when multiplex transmission is performed on user receivers but a transmitter and a receiver use partial CSI and local CSI, respectively.

The spectral efficiency in the case of a coordinated beamforming algorithm is lower by 0.7 bits/sec/Hz than that in the case of the sum-capacity. The use of the coordinated beamforming algorithm makes it possible to design an effective method of transmitting information about RX filters to user receivers by transmitting only one layer to each user receiver B. Farhang-Boroujeny, Q. Spencer and L. Swindlehurst, "Layering Techniques for Space-Time Communication in Multi-User Networks", in Proceedings of IEEE Vehicular Technology Conference (VTC'03 Fall), Orlando, Fla., Oct. 6-9, 2003, Vol. 2, pp. 1339-1343.

Hereinafter, the coordinated beamforming algorithm will be described in detail.

First, an algorithm for computing TX/RX filters is as follows:

Computation Phase $A_i$ represents the $i^{th}$ column of a matrix A. When the matrix A is Singular Value Decomposition (SVD)-processed; A=UDV*. Here, U and V are unitary matrixes and D is a singular value of the matrix A with diagonal elements arranged in descending order. The principal left singular vector of the matrix A is denoted as $U_1$ that is the first column of the matrix U.

The following computation is performed on the assumption that a base station has a complete CSI.

Initialization
for k=1:K
   $H_k$=UDV SVD
   $W_k$=$U_1$
end
Repeat times:
Effective channel vector computation
for k=1:K
   $H_{eff,k}$=$W^*_k H_k$
end
Update of TX/RX filters for $k = 1:K$ $$H_{stacked,k} = [\ H^T_{eff,1} \ \ldots \ H^T_{eff,k-1} \ H^T_{eff,k+1} \ \ldots \ H^T_{eff,K}\ ]^T$$

$$H_{stacked,k} = U_k D_k V_k \quad\quad SVD$$

$$M_k = V_{k,N}$$

$$W_k = \frac{H_k V_{k,N}}{\|H_k V_{k,N}\|}$$

end

End of iterations where SVD represents Singular Value Decomposition, D is a diagonal matrix, and U and V are unitary matrixes. $H_{eff,k}$ represents an effective channel matrix of a user receiver k that the receiver actually experiences, and $H_{stacked,k}$ represents effective channels of receivers of all users other than the user receiver k. $M_k$ is a TX filter matrix for the user receiver k, $W_k$ is an RX filter matrix for the user receiver k, and $V_{k,n}$ is a singular vector in the num space of $H_{stacked,k}$. T represents a transpose, and * represents a complex conjugate transpose.

When the algorithm is iterated to convergence, a transmitter performs zero-forcing beamforming (ZFBF) on each user receiver based on an effective channel matrix containing an RX filter.

Although not indicated in the above algorithm, SVD is again used to calculate $W_k$ from $M_k$. As a result, the above algorithm performs SVD on each user receiver twice during the computation of the TX/RX filters and performs SVD once during the initialization, which causes a complexity problem.

Moreover, the base station knows the optimal TX/RX filters for each of N user receivers but the user receivers do not. However, the above algorithm is silent on a technique for informing the receivers of the optimal RX filters. What is therefore required is a scheme for informing the receivers of the optimal RX filters.

In addition a data transmitting apparatus and method for a multi-antenna communication system that can provide a simpler scheme for computing a TX filter and an improved scheme for enabling a receiver to easily compute an RX filter is also needed. What is also required is a data receiving apparatus and method for a multi-antenna communication system that can efficiently receive a TX filter computed by a transmitter. In the result, a data transmitting/receiving apparatus and method for a multi-user multi-antenna communication system that can be implemented even when a receiver does not know channels of other receivers, can reduce the system complexity, and can increase the spectral efficiency is also needed.

SUMMARY OF THE INVENTION

An object of the present invention is to substantially solve at least the above problems and/or disadvantages and to provide at least the advantages below. Accordingly, an object of the present invention is to provide a data transmitting apparatus and method for a multi-antenna communication system that computes an RX filter and a TX filter in an improved scheme and transmits an index of a codebook correlating with the computed TX filter or the computed RX filter to a data receiving apparatus.

Another object of the present invention is to provide a data receiving apparatus and method that receives the codebook index from the data transmitting apparatus and detects an RX filter using the received codebook index.

According to one aspect of the present invention, there is provided a transmitter for a multi-user multi-antenna communication system, the transmitter including a Spatial Multiplexing (SM) TX filter unit for computing one of a TX filter and n RX filter for each user receiver, selecting a codebook with the highest correlation to the computed TX filter or the computed RX filter, and outputting an index of the selected codebook; and a plurality of antennas for transmitting the index of the selected codebook to each user receiver.

According to another aspect of the present invention, there is provided a receiver for a multi-user multi-antenna communication system, the receiver including one or more antennas for receiving a codebook index from a transmitter; and an SM RX filter unit for detecting an RX filter corresponding to the received codebook index so that the detected RX filter is used to decode data received from the transmitter.

According to a further aspect of the present invention, there is provided a method for transmitting data from a transmitter in a multi-user multi-antenna communication system, the method including performing an SM TX filtering operation of computing a TX filter or an RX filter for each user receiver, selecting a codebook with the highest correlation to the computed TX filter or the computed RX filter, and outputting an index of the selected codebook; and transmitting the index of the selected codebook to each user receiver through a plurality of antennas.

According to still another aspect of the present invention, there is provided a method for receiving data at a receiver in a multi-user multi-antenna communication system, the method including receiving a codebook index from a transmitter through one or more antennas; and detecting an RX filter corresponding to the received codebook index so that the detected RX filter is used to decode data received from the transmitter.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a data transmitting apparatus and method for a multi-user multi-antenna communication system that computes an RX filter and a TX filter in an improved scheme and transmits an index of a codebook correlating with the computed TX filter or the computed RX filter to a receiver; and a data receiving apparatus and method that receives the codebook index from the data transmitting apparatus and detects an RX filter corresponding to the received codebook index.

The present invention is premised on a communication system where a transmitter knows DL CSI on a receiver. In the following description, a Time Division Duplexing (TDD) multi-user multi-antenna communication system where a BS transmitter can obtain DL CSI by estimation of an uplink (UL) channel is taken as an example.

The present invention considers a multi-user multi-antenna communication system where a BS transmitter has N TX antennas and a user receiver k among a plurality of user receivers has $N_k$ RX antennas, as illustrated in FIG. 1. A channel between the transmitter and the user receiver k is represented by a matrix $H_k$. When a channel changes slower than DL/UL frames, it can be said that the channel is constant for several frames and is the same throughout a downlink and an uplink. In this case, a BS and user receivers estimate the same channel. The BS can estimate all channel matrixes $H_k$ (k=1, ..., k,) between the BS transmitter and the user receivers using a data transmission or uplink sounding pilots transmitted by the user receivers. In other embodiment the user receiver k can estimate a matrix $H_k$ and the user receiver k reports the estimated $H_k$ to the BS. The transmitter and the receivers perform the channel estimation using a well-known scheme.

One layer is transmitted from the BS to N user receivers, which is the same as the number of the TX antennas. This transmission model is illustrated in FIG. 2. A scheduling algorithm is used to select a user receiver. The scheduling algorithm allocates frequency, time, and space in consideration of factors such as the amount of work, delay, and Quality of Service (QoS), and uses a scheme for maximizing transmission efficiency. This scheduling algorithm may be conventional, and a scheduler for implementing the scheduling algorithm is installed preceding the SM TX filters 210, 220, ..., 230 in FIG. 2.

After performance of the scheduling algorithm, the transmitter performs the following computation phase.

Computation Phase

A simplified algorithm for computing a TX filter $M_k$ is used to reduce complexity in the case where one layer is transmitted to each user receiver. The present invention simultaneously obtains N TX filters for N user receivers by the pseudo-inversion of effective channel matrixes. By doing this, a complex SVD operation which needs to be performed on a digital signal process twice in each iteration phase in each user receiver, can be omitted to simplify computation.

In addition, an SVD operation necessary for initialization in each user receiver can be omitted by setting an initial RX filter to a random unitary vector.

The simplified algorithm which, reduces the complexity involved, is comprised of the following steps:

Firstly, the RX filter is initialized to a random value for each of the K users.

Secondly, the following computation is repeated Ni times: Compute the effective channel matrix using the current RX filters. Then compute the pseudo-inverse of the effective channel matrix using the current RX filters and the channel matrices. Then for each user k, update the current TX filter as the normalized k-th column of the inverted effective channel matrix. Update the RX filter for each user k as the product of the channel matrix of user k by its current TX filter, followed by normalization.

The simplified algorithm for the complexity reduction is as follows:

Initialization
for k=1:K
    $W_k$=random unitary vector of size $N_k \times 1$
end
Repeat $N_i$ times:
Define $.H_{eff} = [(W^*_1 H_1)^T \ldots (W^*_k H_k)^T \ldots (W^*_K H_K)^T]^T$
Compute $.H^\backslash_{eff} = H^\backslash_{eff}(H_{eff} H_{eff}^\dagger)^{-1}$ for $k = 1:K$ $$M_k = \frac{H^\dagger_{eff,k}}{\|H^\dagger_{eff,k}\|}$$

$$W_k = \frac{H_k M_k}{\|H_k M_k\|}$$

end

End of iterations where $H_k$ represents a channel matrix of a user receiver k, $H_{eff}$ represents an effective channel matrix of a user receiver that the receiver actually experiences, $H^\backslash_{eff}$ represents a pseudo-inversion matrix of the effective channel matrix $H_{eff}$, $M_k$ is a TX filter matrix for the user receiver k, $W_k$ is an RX filter matrix for the user receiver k, T represents a transpose, and * represents a complex conjugate transpose.

In an alternative computation algorithm, an initial value of a TX filter is set to $1_N + i1_N$ where $1_N$ is a column vector with a length of N whose every entry is 1. Although the initial value is not optimized, the performance is the same as in any initial value. Therefore, the initial value is easier to set up and the performance is the same as in the previous computation algorithm.

The alternate computation algorithm is comprised of the following steps:

Firstly, the TX filter is initialized to the value $1_N+i1_N$ for each of the K users. For each user k, compute the matrix equal to the product of the transpose conjugate of the channel matrix of user k by the channel matrix of user k.

Secondly, the following computation is repeated Ni times: Compute the effective channel matrix using the current TX filters and the matrices computed in the initialization step. Then compute the pseudo-inverse of the effective channel matrix. Then for each user k, update the current TX filter as the k-th column of the inverted effective channel matrix.

Thirdly, normalize the TX filter for each user k. Then for each user k, compute the RX filter as the product of the channel matrix of user k by its TX filter, followed by normalization.

The alternative computation algorithm is summarized as follows:

Initialization $$\text{for } k = 1:K$$
$$M_k = 1_N + i1_N$$
$$\overline{H_k} = H_k^* H_k$$
end Repeat $N_i$ times:
$H_{\text{eff}} = [(M^*_1 \overline{H_1})^T \ldots (M^*_k \overline{H_k})^T \ldots (M^*_K \overline{H_K})^T]^T$
$M = H_{\text{eff}}(H_{\text{eff}} H_{\text{eff}}^\dagger)^{-1}$
End of iterations
Normalize RX filters $$\text{for } k = 1:K$$
$$M_k \leftarrow \frac{M_k}{\|M_k\|}$$
$$W_k = \frac{H_k M_k}{\|H_k M_k\|}$$
End where $H_k$ represents a channel matrix, $\overline{H}_k$ represents a modified matched channel matrix, $H_{\text{eff}}$ represents an effective channel matrix that a user receiver actually experiences, $M_k$ is a TX filter matrix for a user receiver k, $W_k$ is an RX filter matrix for the user receiver k, T represents a transpose, and * represents a complex conjugate transpose.

Because the channel matrixes change with time, the above algorithm can be used as a process for updating the TX filters. The computation for the initialization is simple. In addition, if a channel change is sufficiently slow, the time-dependent performance can be maintained by only a few iterations. The above algorithm is advantageous in that neither the TX filter computation nor the RX filter computation requires the SVD. Also, the filter computation complexity of the above algorithm is even lower than that of a single-user closed-loop MIMO transmission scheme. Moreover, for all users, the RX structure of the above algorithm is simpler than that of a single-user open-loop layer transmission scheme. In addition, the transmission efficiency of the above algorithm is much higher than that of the single-user case.

Training Phase

As described above, a transmitter computes a TX filter or an RX filter, selects a codebook correlating with the computed TX filter or the computed RX filter, and transmits an index of the selected codebook to a receiver.

The receiver receives the codebook index from the transmitter and detects an RX filter corresponding to the received codebook index from a given codebook.

In the present invention, a BS transmitter computes a TX filter or an RX filter through the above process, selects a codebook correlating with the computed TX filter or a codebook correlating with the computed RX filter through a series of search processes. At this point, it is preferable to select a codebook with the highest correlation. The BS transmitter transmits an index of the selected codebook. Each receiver (terminal) detects an RX filter corresponding to the received index from a given codebook. A process of selecting the codebook with the highest correlation will be described in detail below. A procedure for detecting the RX filter at the receiver can be summarized as follows:

When a TX filter index is used, the procedure includes the following steps:

1) The BS computes a TX filter $M_k$ using all channel information.

2) The BS computes the correlation between the TX filter $M_k$ and a stored codebook for each user receiver and selects a codebook with the highest correlation.

3) The BS transmitter transmits an index of the selected codebook to a receiver (terminal).

4) The receiver receives an index ($H_k M'_k$) over a channel, acquires a TX filter index obtained by excepting a channel estimation value from the index ($H_k M'_k$), and detects and normalizes an RX filter $W_k$ corresponding to the TX filter index using a given codebook by Equation (1):

$$W_k = \frac{H_k M'_k}{\|H_k M'_k\|} \quad (1)$$

where $M'_k$ is the index of the TX filter $M_k$.

When an RX filter is used, the procedure includes the following steps:

1) The BS computes an RX filter $W_k$ using all channel information.

2) The BS computes the correlation between the RX filter $W_k$ and a stored codebook for each user receiver and selects a codebook with the highest correlation.

3) The BS transmitter transmits an index of the selected codebook to a receiver (terminal).

4) The receiver receives the index from the BS transmitter and detects an RX filter $W_k$ from a given codebook with the received index. In this case, channel estimation is unnecessary.

An example of the above codebook is a beamforming matrix codebook defined in the Institute of Electrical and Electronics Engineers (IEEE) 802.16e standard.

Table 1 illustrates a portion of the beamforming matrix codebook.

TABLE 1

| Index | Column1 | Column2 |
|-------|---------|---------|
| w1    | 0       | 0       |
|       | 1       | 0       |
|       | 0       | 1       |

TABLE 1-continued

| Index | Column1 | Column2 |
|---|---|---|
| w2 | −0.7201 + j0.3126<br>−0.2326<br>0.1898 − j0.5419 | 0.2483 + j0.2684<br>0.1898 + j0.5419<br>0.7325 |
| w3 | −0.0659 − j0.1371<br>0.9537<br>0.0752 − j0.2483 | −0.6283 + j0.5763<br>0.0752 + j0.2483<br>−0.4537 |
| w4 | −0.0063 − j0.6527<br>0.1477<br>0.4394 + j0.5991 | 0.4621 + j0.3321<br>0.4394 − j0.5991<br>0.3522 |
| w5 | 0.7171 − j0.3202<br>−0.2337<br>0.1951 − j0.5390 | −0.2533 − j0.2626<br>0.1951 + j0.5390<br>0.7337 |
| w6 | 0.4819 + j0.4517<br>0.1354<br>−0.7127 + j0.1933 | 0.2963 + j0.4801<br>−0.7127 − j0.1933<br>0.3692 |
| w7 | 0.0686 + j0.1386<br>0.9522<br>0.0770 − j0.2521 | 0.6200 − j0.5845<br>0.0770 + j0.2521<br>−0.4522 |
| w8 | −0.0054 + j0.6540<br>0.1446<br>0.4363 + j0.6009 | −0.4566 − j0.3374<br>0.4363 − j0.6009<br>0.3554 |

In Table 1, Column 1 and Column 2 represent transport streams and Rows in each w represent TX antennas. In detail, Row 1, Row 2 and Row 3 represent Antenna 1, Antenna 2 and Antenna 3, respectively. That is, Table 1 illustrates an example of the case where the number of TX antennas is three, the number of transport streams is two, and feedback information is represented using 3 bits. The IEEE 802.16e employs a total of 19 different codebooks for the case where the number of TX antennas is 2~4, the number of transport streams is 1~4, and feedback information is represented using 3 bits or 6 bits.

The Step 2 of the above procedure will now be described in detail. Both the transmitter and the receiver store a codebook, and the codebook may be obtained by random search using a Grassmanian scheme.

An example of the codebook design has been described above. The present invention selects a prestored codebook through the following process.

The transmitter computes the correlation between the RX filter $W_k$ and the stored codebook to select a codebook with the highest correlation. U denotes the stored codebook, and $W_k$ denotes an RX filter that is computed using actual channel information. The correlation between U and $W_k$ is computed to select the codebook with the highest correlation, which can be expressed as Equation (2):

$$i = \underset{i \neq jC}{\mathrm{argmax}} |U_j^* W_k| \qquad (2)$$

where $U_j$ denotes the $j^{th}$ codebook among a total of C codebooks, and $W_k$ denotes an actual RX filter of the $k^{th}$ user receiver. The transmitter selects an index i of a codebook with the highest correlation between $U_j$ and $W_k$.

That is, the transmitter computes a TX filter or an RX filter for each user receiver, selects a codebook with the highest correlation to the computed TX filter or the computed RX filter, and transmits an index of the selected TX filter codebook or an index of the selected RX filter codebook to a receiver. At this point, an SM TX filter unit of the transmitter computes the TX filter and the RX filter, selects the codebook with the highest correlation to the computed TX filter or the computed RX filter, and outputs the index of the selected codebook. The index of the selected codebook is transmitted to the receiver through a plurality of antennas of the transmitter.

Data Transmission Phase

A BS transmitter transmits the product of a TX filter and a vector of modulation symbols s (where $s_k$ is a symbol transmitted to a user receiver k). Theses symbols are transmitted over a channel under the total TX power $P_0$.

The total TX power is equally allocated to N layers (from N TX antennas to the respective user receivers).

A transmitted vector is:

$$x = \sqrt{\frac{P_0}{N}} \sum_{n=1}^{N} M_n s_n$$

A signal received by the user receiver k is:

$$y_k = \sqrt{\frac{P_0}{N}} H_k \sum_{n=1}^{N} M_n s_n + w_k$$

The user receiver k multiplies the received signal by its RX filter to obtain $$\hat{s}_k = \hat{W}_k^* y_k,$$

$$\hat{s}_k = \hat{W}_k^* \left( \sqrt{\frac{P_0}{N}} H_k \sum_{n=1}^{N} M_n s_n + w_n \right),$$

$$\hat{s}_k = \sqrt{\frac{P_0}{N}} \sum_{n=1}^{N} \hat{W}_k^* H_k M_n s_n + W_k^* w_n.$$

Theoretically, if $\hat{W}_k = W_k$, $$\hat{W}_k H_k M_n = \begin{cases} 0, k \neq n \\ 1, k = n \end{cases}.$$

Therefore, $$\hat{s}_k = \sqrt{\frac{P_0}{N}} s_k + w_k$$

in theory, where $H_k$ is a channel between the transmitter and the user receiver k, $M_n$ is a TX matrix for a user receiver n, $W_k$ is an RX matrix for the user receiver k, $P_0$ is the total TX power, and $w_k$ and $w_n$ are additive white gaussian noise (AWGN).

On the assumption that user receivers can perfectly estimate RX filters, the BS can adapt the power allocated to each layer using a conventional waterfilling scheme instead of a uniform power allocation scheme, thereby increasing the transmission efficiency.

Figure 4A:
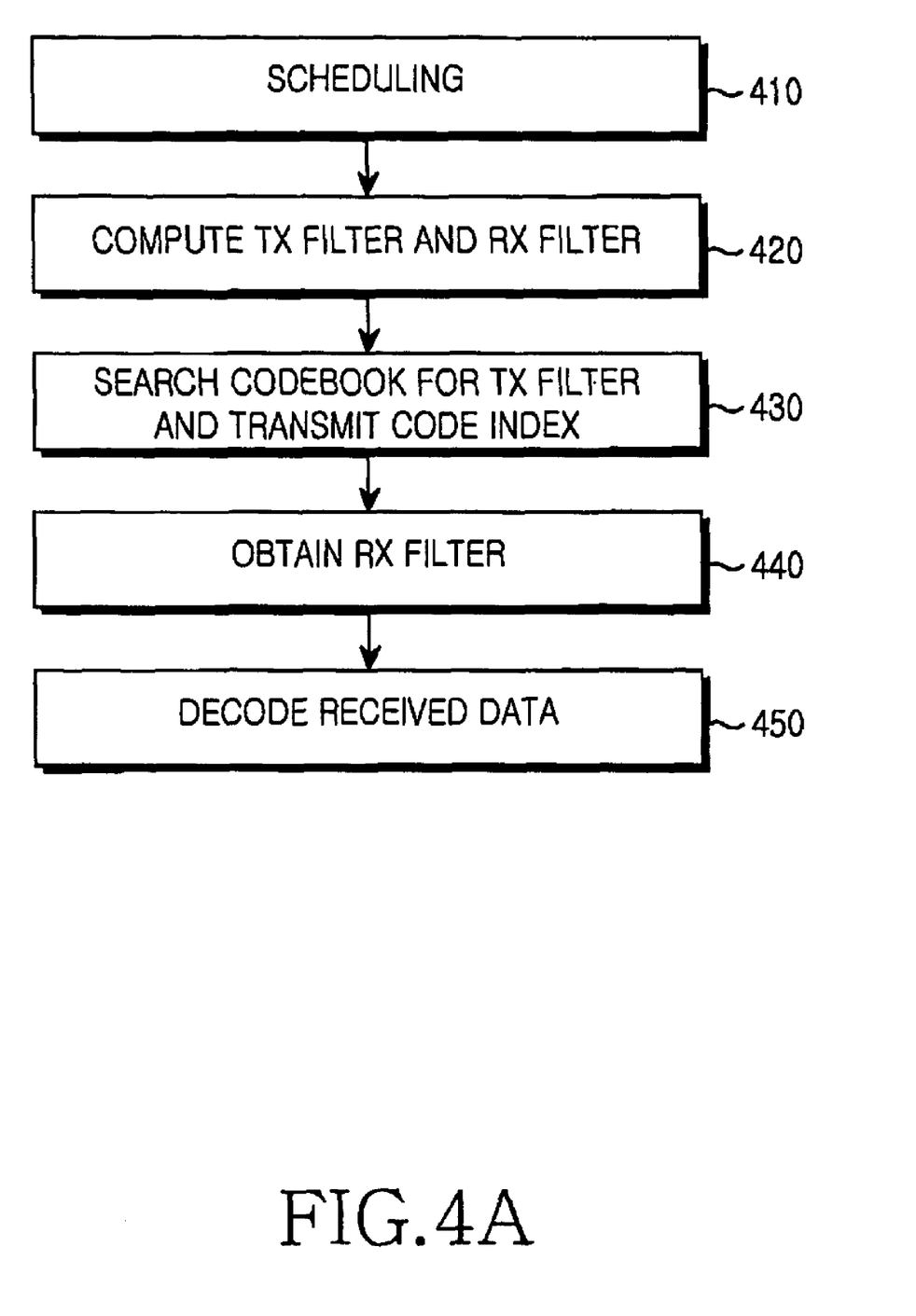
FIGS. 4A and 4B are flowcharts illustrating a communication procedure in a multi-user multi-antenna communication system using an algorithm according to the present invention.
Figure 4B:
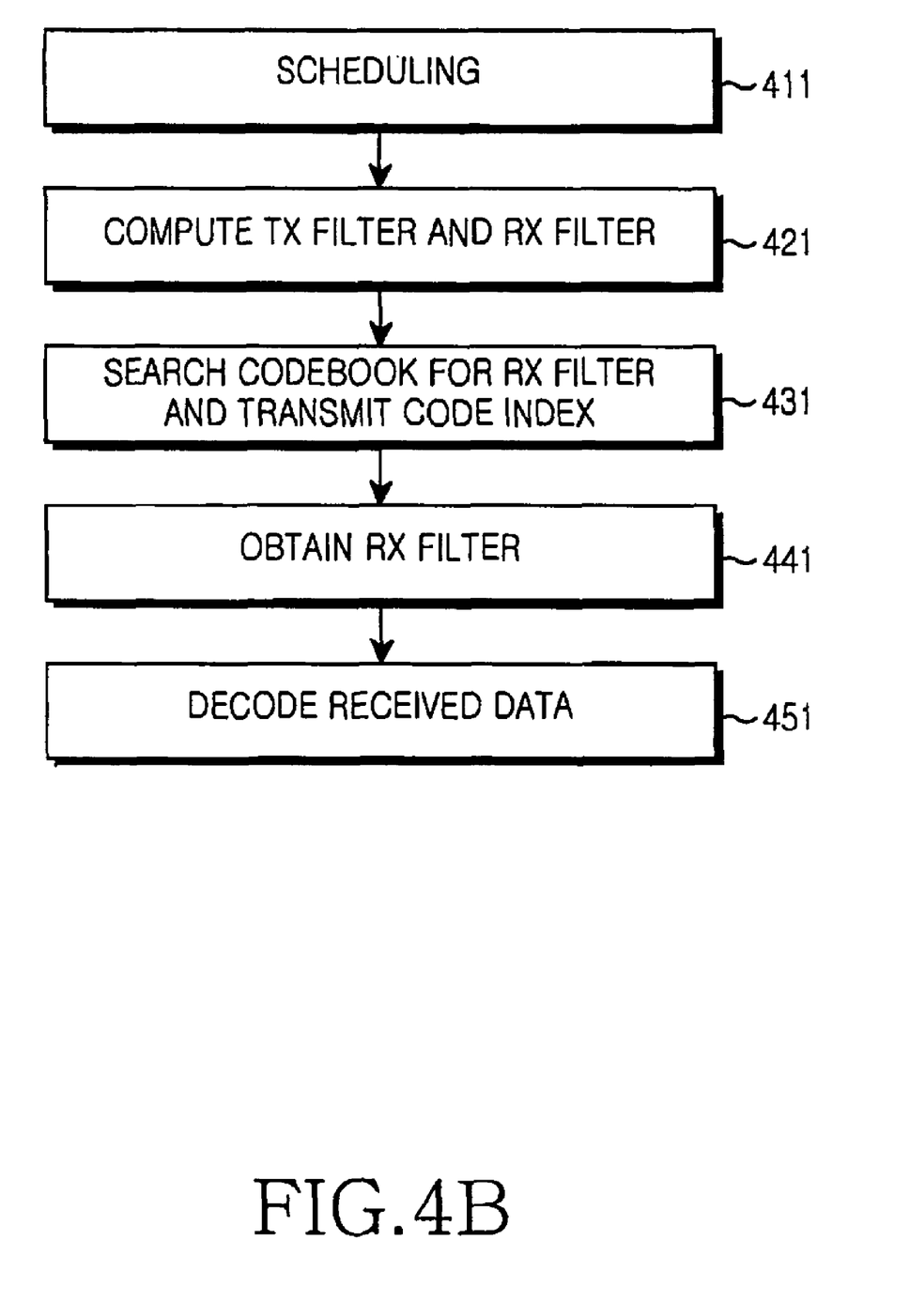

FIGS. 4A and 4B are flowcharts illustrating a communication procedure in a multi-user multi-antenna communication system using an algorithm according to the present invention.

Referring to FIG. 4A, a transmitter performs a scheduling operation for determining to which user receiver it will transmit data, in step 410. An Adaptive Modulation and Coding (AMC) operation may also be performed in step 410. In step 420, the transmitter computes a TX filter and an RX filter using the improved scheme of the present invention. In step 430, the transmitter selects a codebook with highest correlation to the computed TX filter by codebook search and transmits an index of the selected codebook to a receiver. In step 440, the receiver receives an index ($H_kM'_k$) over a channel, acquires a TX filter index obtained by excepting a channel estimation value from the index ($H_kM'_k$), and detects an RX filter $W_k$ corresponding to the TX filter index from a given codebook.

In step 450, the receiver decodes received data using the detected RX filter.

Referring to FIG. 4B, a transmitter performs a scheduling operation for determining to which user receiver it will transmit data, in step 411. An AMC operation may also be performed in step 411. In step 421, the transmitter computes a TX filter and an RX filter using the improved scheme of the present invention. In step 431, the transmitter selects a codebook with highest correlation to the computed RX filter by codebook search and transmits an index of the selected codebook to a receiver. In step 441, the receiver receives the index from the transmitter and detects an RX filter $W_k$ from a given codebook with the received index. In step 451, the receiver decodes received data using the detected RX filter.

Simulation Results

The performance of the present invention will now be examined in terms of the spectral efficiency using Monte-Carlo simulation.

Figure 5:
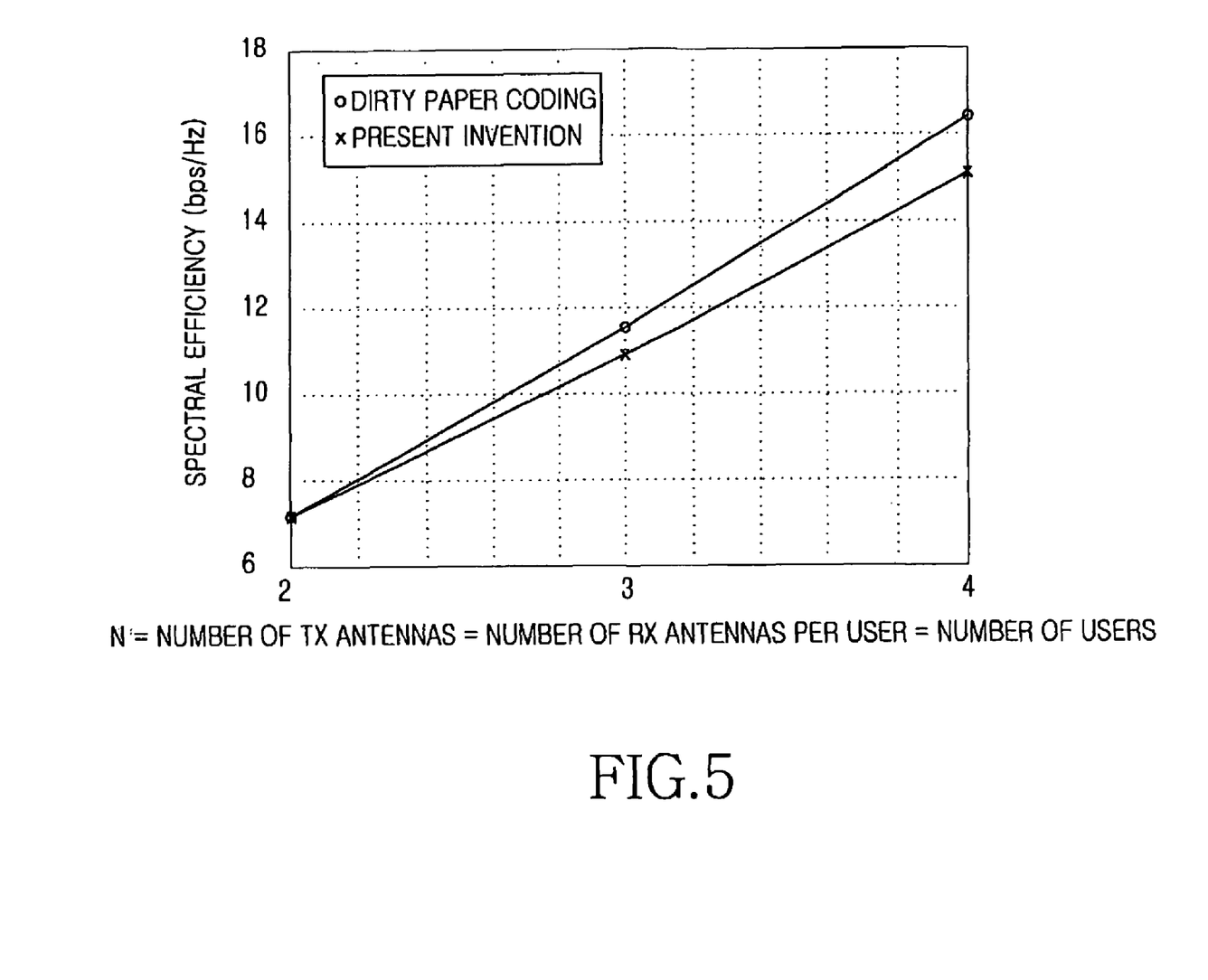
FIG. 5 is a graph illustrating spectral efficiencies depending on the number of TX antennas (i.e., the number of RX antennas or the number of user receivers) in a multi-user multi-antenna communication system using an algorithm according to the present invention.

FIG. 5 is a graph illustrating spectral efficiencies depending on the number of TX antennas (i.e., the number of RX antennas or the number of user receivers) in a multi-user multi-antenna communication system using an algorithm according to the present invention. The conditions in FIG. 5 are identical to those in FIG. 3. The algorithm according to the present invention can be implemented in an actual system. A dirty paper coding algorithm is the theoretically best case. As can be seen from FIG. 5, the algorithm according to the present invention is very similar in performance to the dirty paper coding algorithm.

As described above, the transmitter computes a TX filter and an RX filter in the improved scheme, selects a codebook with the highest correlation to the computed TX filter or the computed RX filter, and transmits an index of the selected codebook to the receiver. The receiver receives the codebook index from the transmitter and detects a corresponding RX filter from a given code book using the received codebook index. Accordingly, it is possible to reduce the system complexity. In addition, a multi-user multi-antenna communication system can be implemented even when the receiver does not know the channels of other user receivers.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A transmitter for a multi-user multi-antenna communication system, the transmitter comprising:
   a Spatial Multiplexing (SM) transmit (TX) filter unit for computing a TX filter for each user receiver, selecting a codebook having a highest correlation to each computed TX filter among prestored codebooks, and outputting an index of each selected codebook; and
   a plurality of antennas for transmitting the index of each selected codebook to each respective user receiver;
   wherein the codebook is selected using the following:

$$i = \underset{i \neq jC}{\arg\max} |U_j^* W_k|$$

where $U_j$ denotes a $j^{th}$ codebook among a total of C codebooks, $W_k$ denotes an actual receive (RX) filter of the $k^{th}$ user receiver, and an index i of a codebook with a highest correlation between $U_j$ and $W_k$ is selected.

2. The transmitter of claim 1, wherein the transmitter determines a data transmission schedule for a plurality of user receivers and provides the determined data transmission schedule to the SM TX filter unit.

3. The transmitter of claim 1, wherein an N number of TX filters for an N number of user receivers are computed by pseudo-inversion of effective channel matrixes.

4. The transmitter of claim 1, wherein the SM TX filter unit computes TX filters by setting initial RX filters to random unitary vectors.

5. The transmitter of claim 1, wherein the TX filters are computed using channel matrixes between the transmitter and the user receivers.

6. The transmitter of claim 5, wherein the channel matrixes are estimated using uplink sounding pilots from the user receivers.

7. The transmitter of claim 5, wherein the channel matrixes are reported by the user receivers.

8. The transmitter of claim 1, wherein the TX filters are computed using the following:

Initialization
for k=1: K
$W_k$=random unitary vector of size $N_k \times 1$
end
Repeat $N_i$ times:
   Define $H_{eff} = [(W_1^* H_1)^T \ldots (W_k^* H_k)^T \ldots (W_K^* H_K)^T]^T$
   Compute $H_{eff}^\dagger = H_{eff}^\dagger (H_{eff} H_{eff}^\dagger)^{-1}$ for $k = 1:K$ $$M_k = \frac{H_{eff,k}^\dagger}{\|H_{eff,k}^\dagger\|}$$

$$W_k = \frac{H_k M_k}{\|H_k M_k\|}$$

end

End of iterations
where $H_{eff}$ represents an effective channel matrix of a user receiver that the receiver experiences, $H^\dagger_{eff}$ represents a pseudo-inversion matrix of the effective channel matrix $H_{eff}$, $M_k$ is a TX filter matrix for a user receiver k, $W_k$ is an RX filter matrix for the user receiver k, T represents a transpose, and * represents a complex conjugate transpose.

9. The transmitter of claim 1, wherein the TX filters are computed using the following:
Initialization for $k = 1:K$ $$M_k = 1_N + i1_N$$

$$\overline{H}_k = H_k^* H_k$$

end

Repeat $N_i$, times:
$H_{\mathit{eff}}=[(M_1^*\overline{H_1})^T \ldots (M_k^*\overline{H_k})^T \ldots (M_K^*\overline{H_K})^T]^T$
$M=H_{\mathit{eff}}^\dagger(H_{\mathit{eff}}H_{\mathit{eff}}^\dagger)^{-1}$
End of iterations
Normalize RX filters for $k = 1:K$ $$M_k \leftarrow \frac{M_k}{\|M_k\|}$$

$$W_k = \frac{H_k M_k}{\|H_k M_k\|}$$

End where $H_k$ represents a channel matrix, $\overline{H}_k$ represents a modified matched channel matrix, $H_{\mathit{eff}}$ represents an effective channel matrix that a user receiver experiences, $M_k$ is a TX filter matrix for a user receiver k, $W_k$ is an RX filter matrix for the user receiver k, T represents a transpose, and * represents a complex conjugate transpose.

10. A transmitter for a multi-user multi-antenna communication system, the transmitter comprising:
a Spatial Multiplexing (SM) transmit (TX) filter unit for computing a receive (RX) filter for each user receiver, selecting a codebook having a highest correlation to each computed RX filter among prestored codebooks, and outputting an index of each selected codebook; and
a plurality of antennas for transmitting the index of each selected codebook to each respective user receiver;
wherein the codebook is selected using the following:

$$i = \underset{i \neq jC}{\mathrm{argmax}} |U_j^* W_k|$$

where $U_j$ denotes a $j^{th}$ codebook among a total of C codebooks, $W_k$ denotes an actual RX filter of the $k^{th}$ user receiver, and an index i of a codebook with a highest correlation between $U_j$ and $W_k$ is selected.

11. The transmitter of claim 10, wherein an N number of RX filters for an N number of user receivers are simultaneously computed by pseudo-inversion of effective channel matrixes.

12. The transmitter of claim 10, wherein the SM TX filter unit computes RX filters by setting initial RX filters to random unitary vectors.

13. The transmitter of claim 10, wherein the RX filters are computed using channel matrixes between the transmitter and the user receivers.

14. The transmitter of claim 13, wherein the channel matrixes are estimated using uplink sounding pilots from the user receivers.

15. The transmitter of claim 13, wherein the channel matrixes are reported by the user receivers.

16. The transmitter of claim 10, wherein the RX filters are computed using the following:
Initialization
for k=1:K
$W_k$=random unitary vector of size $N_k \times 1$
end
Repeat $N_i$, times:
Define $H_{\mathit{eff}}=[(W_1^*H_1)^T \ldots (W_k^*H_k)^T \ldots (W_k^*H_k)^T]^T$
Compute $H_{\mathit{eff}}^\dagger = H_{\mathit{eff}}^\dagger(H_{\mathit{eff}}H_{\mathit{eff}}^\dagger)^{-1}$ for $k = 1:K$ $$M_k = \frac{H_{\mathit{eff},k}^\dagger}{\|H_{\mathit{eff},k}^\dagger\|}$$

$$W_k = \frac{H_k M_k}{\|H_k M_k\|}$$

end

End of iterations
where $H_{\mathit{eff}}$ represents an effective channel matrix of a user receiver that the receiver experiences, $H_{\mathit{eff}}^\dagger$ represents a pseudo-inversion matrix of the effective channel matrix $H_{\mathit{eff}}$, $M_k$ is a TX filter matrix for a user receiver k, $W_k$ is an RX filter matrix for the user receiver k, T represents a transpose, and * represents a complex conjugate transpose.

17. The transmitter of claim 10, wherein the RX filters are computed using the following:
Initialization for $k = 1:K$ $$M_k = 1_N + i1_N$$

$$\overline{H}_k = H_k^* H_k$$

end

Repeat $N_i$ times:
$H_{\mathit{eff}}=[(M_1^*\overline{H_1})^T \ldots (M_k^*\overline{H_k})^T \ldots (M_K^*\overline{H_K})^T]^T$
$M=H_{\mathit{eff}}^{\dagger(H}{}_{\mathit{eff}}H_{\mathit{eff}}^\dagger)^{-1}$
End of iterations
Normalize RX filters for $k = 1:K$ $$M_k \leftarrow \frac{M_k}{\|M_k\|}$$

$$W_k = \frac{H_k M_k}{\|H_k M_k\|}$$

End where $H_k$ represents a channel matrix, $\overline{H}_k$ represents a modified matched channel matrix, $H_{\mathit{eff}}$ represents an effective channel matrix that a user receiver experiences, $M_k$ is a TX filter matrix for a user receiver k, $W_k$ is an RX filter matrix for the user receiver k, T represents a transpose, and * represents a complex conjugate transpose.

18. A method for transmitting data from a transmitter in a multi-user multi-antenna communication system, the method comprising the steps of:
 performing a Spatial Multiplexing (SM) transmit (TX) filtering operation of computing a TX filter for each user receiver, selecting a codebook having a highest correlation to each computed TX filter among prestored codebooks, and outputting an index of each selected codebook; and
 transmitting the index of each selected codebook to each respective user receiver through a plurality of antennas;
 wherein the codebook is selected using the following:

$$i = \underset{i \neq jC}{\mathrm{argmax}} |U_j^* W_k|$$

where $U_j$ denotes a $j^{th}$ codebook among a total of C codebooks, $W_k$ denotes an actual receive (RX) filter of the $k^{th}$ user receiver, and an index i of a codebook with a highest correlation between $U_j$ and $W_k$ is selected.

19. The method of claim 18, further comprising determining a data transmission schedule for a plurality of user receivers before the SM TX filtering operation.

20. A method for transmitting data from a transmitter in a multi-user multi-antenna communication system, the method comprising the steps of:
 performing a Spatial Multiplexing (SM) transmit (TX) filtering operation of computing a receive (RX) filter for each user receiver, selecting a codebook having a highest correlation to each computed RX filter among prestored codebooks, and outputting an index of each selected codebook; and
 transmitting the index of each selected codebook to each respective user receiver through a plurality of antennas;
 wherein the codebook is selected using the following:

$$i = \underset{i \neq jC}{\mathrm{argmax}} |U_j^* W_k|$$

where $U_j$ denotes a $j^{th}$ codebook among a total of C codebooks, $W_k$ denotes an actual RX filter of the $k^{th}$ user receiver, and an index i of a codebook with a highest correlation between $U_j$ and $W_k$ is selected.

21. The method of claim 20, further comprising, before the SM TX filtering operation, determining a data transmission schedule for a plurality of user receivers and providing the determined data transmission schedule to a SM TX filter unit of the transmitter.

22. The method of claim 18, wherein an N number of TX filters for an N number of user receivers are computed by pseudo-inversion of effective channel matrixes.

23. The method of claim 18, wherein an SM TX filter unit computes TX filters by setting initial receive (RX) filters to random unitary vectors.

24. The method of claim 18, wherein TX filters are computed using channel matrixes between the transmitter and the user receivers.

25. The method of claim 24, wherein the channel matrixes are estimated using uplink sounding pilots from the user receivers.

26. The method of claim 24, wherein the channel matrixes are reported by the user receivers.

27. The method of claim 18, wherein the TX filters are computed using the following:
 Initialization for k=1: K
 $W_k$=random unitary vector of size $N_k \times 1$
 end
 Repeat $N_i$ times:
  Define $.H_{\mathit{eff}} = [(W_1^* H_1)^T \ldots (W_k^* H_k)^T \ldots (W_K^* H_K)^T]^T$
  Compute $.H_{\mathit{eff}}^\dagger = H_{\mathit{eff}}^{554} (H_{\mathit{eff}} H_{\mathit{eff}}^\dagger)^{-1}$ for $k = 1:K$ $$M_k = \frac{H_{\mathit{eff},k}^\dagger}{\|H_{\mathit{eff},k}^\dagger\|}$$

$$W_k = \frac{H_k M_k}{\|H_k M_k\|}$$

end

End of iterations
 where $H_{\mathit{eff}}$ represents an effective channel matrix of a user receiver that the receiver experiences, $H^\dagger_{\mathit{eff}}$ represents a pseudo-inversion matrix of the effective channel matrix $H_{\mathit{eff}}$, $M_k$ is a TX filter matrix for a user receiver k, $W_k$ is an RX filter matrix for the user receiver k, T represents a transpose, and * represents a complex conjugate transpose.

28. The method of claim 18, wherein the TX filters are computed using the following:
 Initialization for $k = 1:K$ $M_k = 1_N + i1_N$ $\overline{H}_k = H_k^* H_k$ end Repeat $N_i$ times:
  $H_{\mathit{eff}} = [(M^1 * \overline{H_1})^T \ldots (M_k * \overline{H_K})^T]^T$
  $M = H_{\mathit{eff}}^\dagger (H_{\mathit{eff}} H_{\mathit{eff}}^\dagger)^{-1}$
 End of iterations
 Normalize RX filters for $k = 1:K$ $$M_k \leftarrow \frac{M_k}{\|M_k\|}$$

$$W_k = \frac{H_k M_k}{\|H_k M_k\|}$$

End where $H_k$ represents a channel matrix, $\overline{H}_k$ represents a modified matched channel matrix, $H_{\mathit{eff}}$ represents an effective channel matrix that a user receiver experiences, $M_k$ is a TX filter matrix for a user receiver k, $W_k$ is an RX filter matrix for the user receiver k, T represents a transpose, and * represents a complex conjugate transpose.

29. The method of claim 20, wherein an N number of RX filters for an N number of user receivers are simultaneously computed by pseudo-inversion of effective channel matrixes.

30. The method of claim 20, wherein an SM TX filter unit computes RX filters by setting initial RX filters to random unitary vectors.

31. The method of claim 20, wherein RX filters are computed using channel matrixes between the transmitter and the user receivers.

32. The method of claim 31, wherein the channel matrixes are estimated using uplink sounding pilots from the user receivers.

33. The method of claim 31, wherein the channel matrixes are reported by the user receivers.

34. The method of claim 20, wherein the RX filters are computed using the following:
Initialization
for k=1:K
$W_k$=random unitary vector of size $N_k \times 1$
end Repeat $N_t$ times:
   Define $.H_{\mathit{eff}} = [(W_1 * H_1)^T \ldots (W_k * H_k) \ldots (W_K * H_K)^T]^T$
   Compute $.H_{\mathit{eff}}^\dagger = H_{\mathit{eff}}^\dagger (H_{\mathit{eff}} H_{\mathit{eff}}^\dagger)^{-1}$ for $k = 1:K$ $$M_k = \frac{H_{\mathit{eff},k}^\dagger}{\|H_{\mathit{eff},k}^\dagger\|}$$

$$W_k = \frac{H_k M_k}{\|H_k M_k\|}$$

end

End of iterations
where $H_{\mathit{eff}}$ represents an effective channel matrix of a user receiver that the receiver experiences, $H^\dagger_{\mathit{eff}}$ represents a pseudo-inversion matrix of the effective channel matrix $H_{\mathit{eff}}$, $M_k$ is a TX filter matrix for a user receiver k, $W_k$ is an RX filter matrix for the user receiver k, T represents a transpose, and * represents a complex conjugate transpose.

35. The method of claim 20, wherein the RX filters are computed using the following:
Initialization for $k = 1:K$ $M_k = l_N + i l_N$ $\overline{H_k} = H_k^* H_k$ end Repeat N, times:
   $H_{\mathit{eff}} = [(M_1 * \overline{H_1})^T \ldots (M_k * \overline{H_k})^T \ldots (M_K * \overline{H_K})^T]^T$
   $M = (H_{\mathit{eff}}^\dagger (H_{\mathit{eff}} H_{\mathit{eff}}^\dagger)^{-1}$
End of iterations
Normalize RX filters for $k = 1:K$ $$M_k \leftarrow \frac{M_k}{\|M_k\|}$$

$$W_k = \frac{H_k M_k}{\|H_k M_k\|}$$

End where $H_k$ represents a channel matrix, $\overline{H_k}$ represents a modified matched channel matrix, $H_{\mathit{eff}}$ represents an effective channel matrix that a user receiver experiences, $M_k$ is a TX filter matrix for a user receiver k, $W_k$ is an RX filter matrix for the user receiver k, T represents a transpose, and * represents a complex conjugate transpose.

* * * * *